United States Patent
Goumy

[15] 3,670,093
[45] June 13, 1972

[54] ELECTRIC CRYOCONNECTION

[72] Inventor: Daniel Goumy, Seyssinet, France

[73] Assignees: L'Air Liquide, Societe Anonyme Pour L'Etude Et L'Exploitation Des Procedes; Georges Claude and Compagnie Generale D'Electricite, Paris, France

[22] Filed: June 28, 1971

[21] Appl. No.: 157,357

[30] Foreign Application Priority Data

June 30, 1970 France ..................................7024202

[52] U.S. Cl. ..........................174/15 C, 174/16 B, 174/28, 174/99 B, 174/DIG. 6
[51] Int. Cl. ...........................................................H01b 7/34
[58] Field of Search..............174/DIG. 6, 15 R, 15 C, 16 B, 174/99 B, 28, 29

[56] References Cited

UNITED STATES PATENTS

| | | | |
|---|---|---|---|
| 3,431,347 | 3/1969 | Kafka et al. | 174/15 C |
| 3,529,071 | 9/1970 | Kafka | 174/15 C |
| 3,390,357 | 6/1968 | Thomson | 174/15 C X |
| 3,343,035 | 9/1967 | Garwin | 174/DIG. 6 |
| 3,595,275 | 7/1971 | Steans | 174/28 |

*Primary Examiner*—Lewis H. Myers
*Assistant Examiner*—A. T. Grimley
*Attorney*—Young & Thompson

[57] ABSTRACT

An electric cryoconnection operating under very cold conditions comprising an inner elongated cold chamber enclosing a plurality of electric leads, said cold chamber being housed inside a hot chamber with the interposition of heat insulating material and resting on a cradle constituted by transverse cables. Over each cable there are fitted balls lying in contacting relationship with the cold chamber and separated by washers. Said balls and washers are held in position on the cables by stops while the cables are held fast by guys.

9 Claims, 4 Drawing Figures

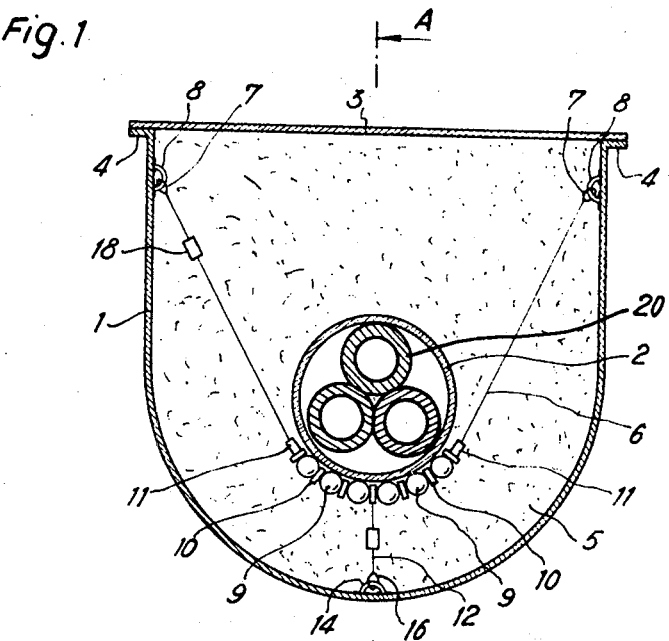
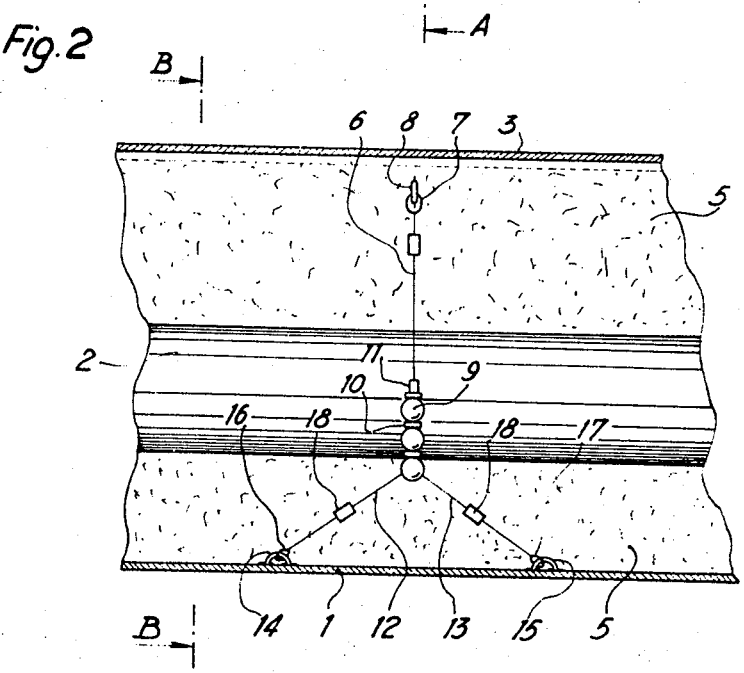

INVENTOR
DANIEL GOUMY
BY Young & Thompson
ATTYS.

ELECTRIC CRYOCONNECTION

The present invention has for its object an electric cryoconnection comprising a cold chamber adapted to convey a cryogenic fluid, which chamber is longitudinally elongated and encloses at least one electric lead which may be cooled through exchange of heat with said fluid, and a hot chamber inside which the cold chamber is housed with a spacing therebetween, the space between the hot chamber and the cold chamber serving as a heat insulating space.

The expression "electric cryoconnection" is to be construed in the present specification and claims as meaning an electric connection constituted by one or more electric cables cooled down to very low temperatures by suitable cryogenic fluid such as liquid helium so that their resistivity may be zero or very low (that is respectively in supraconductive or hyperconductive condition) whereby it is possible to convey intense current over long distances. Such electric cryoconnections are generally constituted by a plurality of chambers nested within one another, the first innermost chamber containing said electric cable or cables forming a cold chamber and the last outermost chamber being a hot chamber while each intermediate chamber plays the part of a hot chamber for the next chamber inside it and the part of a cold chamber for the chamber inside which it is housed.

It has been proposed to carry each cold chamber within each cooperating hot chamber by means of a cradle constituted by cables extending transversely with reference to the longitudinal extension of the cold and hot chambers. Although such carrier means have proved to be comparatively satisfactory, they show important drawbacks.

It each cold chamber is provided with metal walls having a substantial coefficient of expansion, the chamber shrinks to a large extent each time cold is applied. This results of necessity in a substantail longitudinal shifting of each cold chamber with reference to the corresponding hot chamber the walls of which shrink much less. Each cold chamber has a large coefficient of friction with reference to the cradle cables carrying it: the cold chambers are heavier and heavier from the inside towards the outside of the cryoconnection and the surface condition obtained on an industrial scale is comparatively rough and shows numerous unevennesses ascribable in particular to the welding seams. Consequently, unavoidably each cold chamber, when thermally contracting, carries along with it in its shifting the carrier bows of the different cables forming the cradle, which bows assume then a position at an angle with reference to verticality. Any thermal contraction of a cold chamber leads thus generally to a vertical shifting of the latter. This results in a number of objectionable consequences for the cryoconnection as a whole.

Since the cold chamber is always connected more or less rigidly at one or more points to stationary carrier or connecting members, this produces large flexional stresses in the chamber at points in registry with the different joints together with some straining of the material. Such flexional stresses are objectionable for the operation of the cryoconnection considered: on the one hand, in the case of a cold chamber subjected to vacuum, this may lead to a breaking of the vacuum; on the other hand in the case of a cold chamber through which a cryogenic fluid passes, there is a risk of leaks arising.

Furthermore the rising of the cold chamber within the hot chamber is not consistent with the use of an insulating powder. As a matter of fact, when the cold chamber rises within the hot chamber, the insulating powder flows of necessity into the vacuum produced by the vertical shifting of the cold chamber. Consequently, as time elapses and as a consequence of the repeated applications of cold, the insulating powder settles gradually underneath the cold chamber and the latter moves vertically with reference to its starting position into which it can no longer return.

The present invention has for its object to remove such drawbacks.

Said invention covers an electric cryoconnection comprising a cold longitudinally extending chamber adapted to convey a cryogenic fluid, at least one electric lead extending within the cold chamber to be cooled therein through heat exchange with said fluid, a hot chamber inside which the cold chamber is housed with a spacing therebetween fro thermal insulation, cables extending under the cold chamber transversely thereof to hold said cold chamber inside the hot chamber, a runway fitted over a portion of at least one cable and engaging the underside of the cold chamber, means holding fast at least partly said portion of the cable associated with the runway.

Preferably, the runway comprises one or more axially bored bodies of revolution threaded over the corresponding cradle cable.

It is of advantage for such bodies to be separated from one another by at least one stay threaded over the cable, the radial size of said stay being at the utmost equal to the radial size of the runway/bodies while said stay shows a low coefficient of friction with reference to the adjacent runway bodies.

The combination of this runway with means holding fast the portion of the cables associated therewith allows thus chiefly a cutting out of the friction between the cables and the cold chamber and a substitution therefore of the friction between the cables and the runway bodies which latter friction is practically negligible when compared with the first-mentioned friction and may even be improved by a surface treatment or by the selection of suitable material. This same combination provides thus means for wholly compensating the shifting of each cold chamber with reference to the corresponding hot chamber by a rotation of the runway or of the runway bodies round the cradle cables.

When it is being set under cold conditions, the cold chamber shrinks thermally without this producing any shifting of the cables with reference to verticality and consequently without any flexional stress and without any substantial straining of the cold chamber. In the case of a plurality of chambers nested inside one another, the chambers slide with reference to each other when they are being set under cold conditions without any detrimental consequence for the cryoconnection as a whole.

The present invention provides furthermore a number of further advantages.

The carrier cables may be sized taking into account solely the weight they are to support and by no means the further tractional stresses exerted during the setting of the cryoconnection under cold conditions. Their cross section is therefore smaller.

The carrier system proposed in accordance with the present invention is quite consistent with a heat insulating of the powder type; when the cables are secured in position, the cold chamber can move solely in a longitudinal direction.

The cryoconnections according to the invention are particularly simple in their execution and operation.

There are described hereinafter two embodiments of said invention, by way of example, without this being of a limiting character, reference being made to the accompanying drawings wherein:

FIG. 1 is a cross-sectional view passing through line B—B of FIG. 2 of a cryoconnection according to the invention.

FIG. 2 is a partly sectional view through line A—A of FIG. 1 of a part of said cryoconnection.

Figure 3:
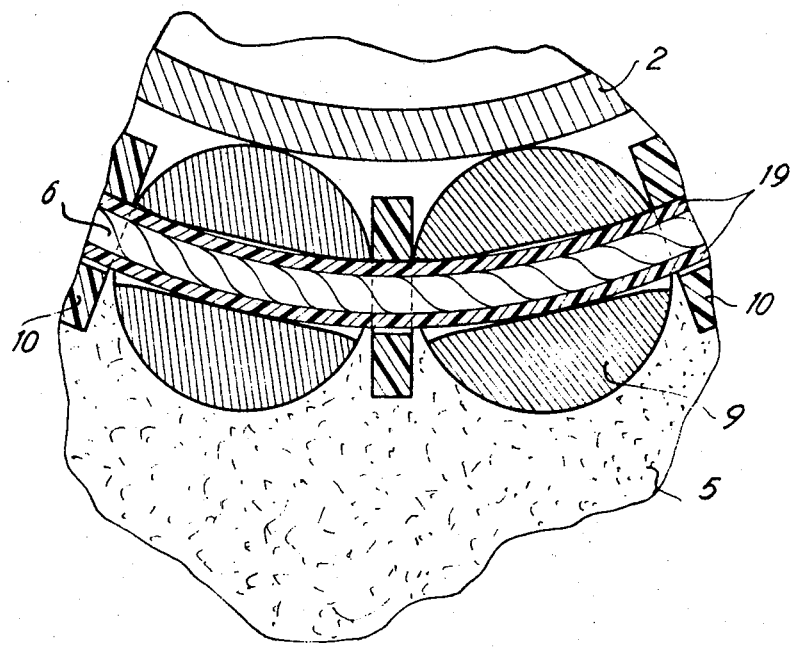
FIG. 3 is a cross section on an enlarged scale of a part of FIG. 1.

The cryoconnection according to the invention, as illustrated in FIGS. 1 to 3, is symmetrical with reference to a vertical plane and is elongated in a substantially horizontal direction. It includes a horizontally extending outer metal chamber or hot chamber 1 having a U-shaped cross section and inside which is housed with a spacing therebetween and inner metal chamber or cold chamber 2 in the shape of a horizontally extending cylindrical tube. The cold chamber 2 encloses one or more hollow electric leads 20 which are bathed and cooled by a cryogenic fluid such as liquid helium flowing inside the cold chamber. The hot chamber 1 is closed by a cover 3 applied over the flanges 4 of said chamber and fluidtightly secured thereto. The space between the hot chamber 1 and the cold chamber 2 is filled with pulverulent heat-insulating material 5.

The cold chamber 2 is carried inside the hot chamber 1 by a cradle constituted by cables identical with that illustrated at 6 and secured by means of snap hooks 7 to rings 8 welded to points of the hot chamber 1 in the upper part of the latter. Each cable 6 is enclosed by a sheath 19 of polytetrafluorethylene.

Over the lower portion of each cable 6, there are threaded metal balls 9, which are provided with a diametrical bore flaring slightly outwardly at both ends, so as to surround said cable. The cold chamber 2 rests directly on said balls 9. Staying washers 10 also threaded over the cable 6 separate the balls 9 from one another. These washers 10 are made of a material having a low coefficient of friction with reference to the balls 9, with a radial size at the utmost equal to that of the balls 9. They are therefore generally not in contact with the cold chamber 2. The balls 9 and the washers 10 are arranged in side by side relationship along a row, each ball 9 being in contact with two washers 10. Stops 11 located at the opposite ends of the row lock the balls longitudinally of the cable 6.

Guys 12 and 13 arranged in V-shaped relationship extend between a point in the lower part of each cable 6, and corresponding rings 14 and 15 welded to the lower part of the hot chamber 1 to which said guys are secured by means of snap hooks 16 and 17. These guys provide a complete fast holding of the operative portion of each cable 6 carrying the balls 9 and the washers 10.

The length of the guys 12 and 13 and of the cable 6 are adjustable by means of adjusting means illustrated at 18. This allows in particular all the cables 6 to support the weight in spite of a possible out-of-round shape of the cold chamber 2.

By way of example, the cables 6 are constituted by strands of stainless steel, the balls 9 are made of bronze and the washers 10 of polytetrafluorethylene. As to the hot and cold chambers 1 and 2, they are generally made of stainless steel.

During a succession of applications of cold and heat, the cold chamber 2 shrinks or expands longitudinally. These movements with reference to the hot chamber 1 are ensured by a rotation of the balls 9 round the cradle cables 6 which are kept in their vertical planes by the guys 12 and 13.

During these movements of the cold chamber, the balls may roll easily with reference to one another as provided by the polytetrafluorethylene washers 10. They roll also very easily round the cable 6 which is enclosed in a sheath 19 of polytetrafluorethylene (see FIG. 3). The balls cannot rise along the cable 6 under the action of the weight of the cold chamber 2 by reason of the presence of the stops 11 located at both ends of the row of balls 9.

Figure 4:
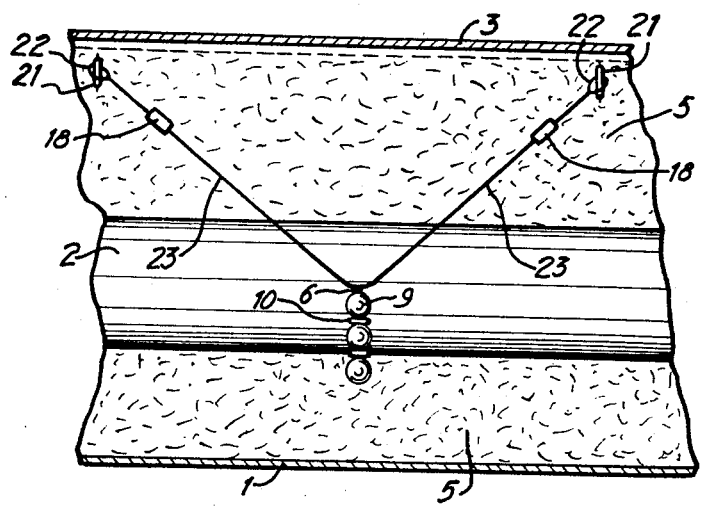
FIG. 4 is a partly sectional longitudinal view of a part of a cryoconnection according to a further embodiment of the present invention.

The cryoconnection according to FIG. 4 and that according to FIGS. 1 to 3 differ solely from each other by the means resorted to for holding fast the operative portion of each cable 6 of the carrier cradle. As illustrated in FIG. 4, the length of the cable 6 is limited to its operative portion, that is the portion round which the balls 9 and the washers 10 are fitted. Each end of a cradle cable 6 is attached to two guys 23 in a relative V-shaped formation. These guys 23 are secured by means of snap hooks 22 to rings 21 welded to points in the upper part of the hot chamber 1. The length of the guys 23 is adjustable as provided by the adjusting means 18. As shown in FIG. 4, it is no longer necessary to secure and adjust guys at points of the bottom of the hot chamber, underneath the cold chamber that is at points the access to which is generally difficult.

Many modifications may be brought to the cryoconnections which have just been described without widening the scope of the invention as defined in the accompanying claims. On the one hand, the runway may be constituted by cylindrical rollers or the like bodies of revolution. On the other hand and in contradistinction with the precedingly described supporting means, the cradle cables may be constituted by strands of polytetrafluorethylene and the runway may be constituted by any suitable metal such as stainless steel.

The cryoconnection according to the present invention may be used for transferring a cryogenic fluid without any further modifications beyond the cutting out of the electric leads carried inside the cold chamber.

What I claim is:

1. In an electric cryoconnection comprising a cold longitudinally extending chamber adapted to convey a cryogenic fluid, at least one electric lead extending within the cold chamber to be cooled therein through heat exchange with said fluid, a hot chamber inside which the cold chamber is housed with a spacing therebetween for thermal insulation, cables extending under the cold chamber transversely thereof to hold said cold chamber inside the hot chamber, the provision of a runway fitted over a portion of at least one cable and engaging the underside of the cold chamber and of means for holding fast at least partly said portion of the cable associated with the runway.

2. A cryoconnection as claimed in claim 1, wherein the runway comprises at least one axially bored body of revolution threaded over the corresponding cable.

3. A cryoconnection as claimed in claim 1, wherein the runway comprises a plurality of diametrically bored balls threaded over the corresponding cable.

4. A cryoconnection as claimed in claim 2, comprising furthermore at least one stay threaded between adjacent bodies of revolution over the cable, the radial size of which being at the utmost equal to that of the runway bodies and said stay having a low coefficient of friction with reference to said runway bodies.

5. A cryoconnection as claimed in claim 1 comprising means locking the runway in longitudinal position on the cable.

6. A cryoconnection as claimed in claims 4 and 5, wherein the runway is constituted by a row of said bodies of revolution and of said stays threaded over the corresponding cable, the connection including furthermore stops fitted at each end of the row to lock the bodies and stays in longitudinal position on the cable.

7. A cryoconnection as claimed in claim 1, comprising a sheath enclosing said portion of the cable associated with the runway, and the frictional coefficient of said sheath with reference to the runway is low.

8. A cryoconnection as claimed in claim 1, wherein the means holding fast at least partly said portion of the cable associated with the runway comprise a V-shaped assembly of two guys extending between a point at the lower part of the cable and the lower part of the hot chamber.

9. A cryoconnection as claimed in claim 1, wherein the means holding fast at least partly said portion of the cable associated with the runway comprise two V-shaped pairs of guys extending each one end of said cable portion and the upper part of the hot chamber.

* * * * *